Feb. 18, 1969 M. ALVARADOS 3,427,996

ROPE HOOK

Original Filed March 5, 1965

INVENTOR.
Matias Alvarados

United States Patent Office 3,427,996
Patented Feb. 18, 1969

3,427,996
ROPE HOOK
Matias Alvarados, 5678 Alondra Drive,
Goleta, Calif. 93017
Continuation of application Ser. No. 437,607, Mar. 5,
1965. This application Mar. 28, 1967, Ser. No. 626,636
U.S. Cl. 105—369                                    1 Claim
Int. Cl. B60r 27/00; B61d 45/00

ABSTRACT OF THE DISCLOSURE

The rope hook comprises a bulged backing member located on one side of an opening in a panel and a hook body located on the opposite side of the panel around the opening. A hook projects from the hook body across the opening to receive the rope. Both the backing member and the hook body are secured to the panel by a plurality of screws passing through the panel.

---

This application is a continuation of my earlier filed application S.N. 437,607, filed Mar. 5, 1965, now abandoned.

My invention relates to a rope hook, and more particularly relates to an ornamental rope hook which is practical as well as attractive to view.

It is an object of my invention to construct an attractive, self-contained and ornamental rope hook which will blend in with the flat surface of any vehicle and more particularly with the flat surface of the sides of a pick-up truck body.

Another object of my invention is to provide an ornamental rope hook which when installed, aside from providing anchors for tying down loads, will not protrude from the surface thus eliminating the danger of snagging.

Other objects of the invention are to provide an improved device of the character described, which is easily and economically produced, that is sturdy in construction, and which is highly effective in use.

With these and related objects in view, the invention consists of the details of construction and combination of parts, as will be more fully understood from the following description, when read in conjunction with the accompanying drawings, in which.

Figure 3:
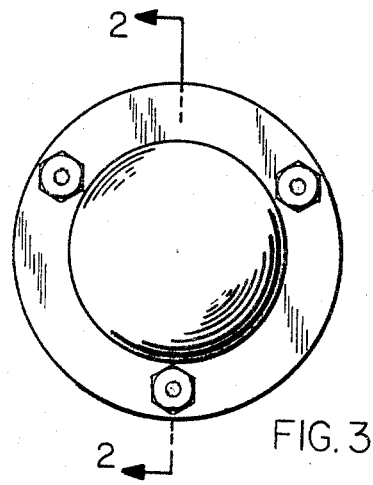
FIG. 3 is a rear elevational view of a rope hook embodying the invention.
Figure 1:
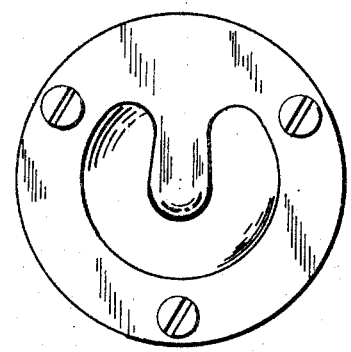
FIG. 1 is a front elevational view of a rope hook embodying the invention.
Figure 2:
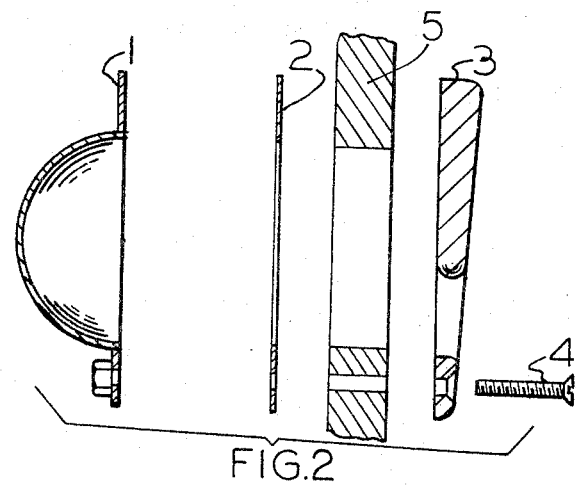
FIG. 2 is an exploded view in perspective along lines 2—2 of FIG. 3 showing the parts necessary for construction of the ornamental rope hook assembly.

Referring now in greater detail to the drawing, in which similar reference characters refer to similar parts, part 1 of FIGURE 2 comprises a shell backing, constructed of metal, which has three threaded nuts and evenly spaced, fused to the back side of the lip of the shell. Part 2 of FIGURE 2 comprises a gasket of thin gasket material, fitted between the shell backing and the pick-up box side.

Part 3 of FIGURE 2 comprises an ornamental rope hook body constructed of a metal ring, flat in appearance, with the hook as an appendage within the ring. The ring and hook are twice as thick where they come together and diminishing to half that thickness at the bottom of the ring. Part 4 of FIGURE 2 illustrates one of the screws used for assembling the hook. Part 5, FIGURE 2 is a section of a panel to which the hook assembly is attached.

All parts, except the screws, have holes, equally spaced and aligned, to accept screws which will screw into the threaded nuts fused behind the lip of shell backing.

To install the hook, a hole is cut through the wall member, to which the hook is to be applied, the size of the inside diameter of the hook ring. With the hook body on the outside of said wall member the three screw holes are drilled through the wall member in alignment with the holes on the hook ring, thus allowing the gasket and the shell backing to be screwed onto opposite sides of said wall member.

I claim:

1. A rope hook attachable to a support panel having an opening therein comprising:
    a backing member comprising a bulged portion extending from said opening on one side of said panel;
    a flat rim around said bulged portion and engaging one side of said panel around the edge of said opening, the entire bulge portion extending from said flat rim and away from said panel;
    a hook body located on the opposite side of said panel from said backing member and comprising a ring portion engaging said opposite side around the edge of said opening and having a center cutout of substantially the same size as said panel opening;
    a hook projecting from said ring portion into said cutout and over said bulged portion for securing a rope inserted between said hook and said bulged portion; and
    fastening means passing through said ring portion, said rim and said panel at the edge of said opening for securing said ring portion and said rim to said panel in spaced apart relationship.

References Cited

UNITED STATES PATENTS

| | | | |
|---|---|---|---|
| 2,623,477 | 12/1952 | Tuttle | 105—369 |
| 2,660,130 | 11/1953 | Johnson | 105—369 |
| 2,675,766 | 4/1954 | Johnson | 105—369 |

DRAYTON E. HOFFMAN, *Primary Examiner.*

UNITED STATES PATENT OFFICE
CERTIFICATE OF CORRECTION

Patent No. 3,427,996                    February 18, 1969

Matias Alvarado

It is certified that error appears in the above identified patent and that said Letters Patent are hereby corrected as shown below:

In the heading to the drawings, line 1, "M. ALVARADOS" should read -- M. ALVARADOS --. In the heading to the printed specification, line 3, "Matias Alvarados" should read -- Matias Alvarado --.

Signed and sealed this 14th day of April 1970.

(SEAL)
Attest:

Edward M. Fletcher, Jr.                WILLIAM E. SCHUYLER, JR.
Attesting Officer                              Commissioner of Patents